Feb. 7, 1950 J. K. ROSE 2,496,752
LIGHT SHIELD FOR OSCILLOSCOPES, TELEVISION
RECEIVERS, AND THE LIKE
Filed Sept. 12, 1946 5 Sheets-Sheet 1

INVENTOR:
Joseph K. Rose,
BY
Pierce, Scheffler & Parker,
ATTORNEYS.

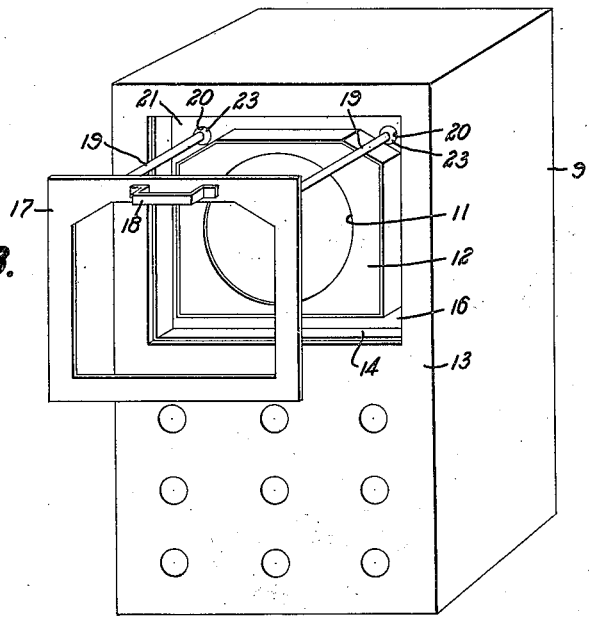
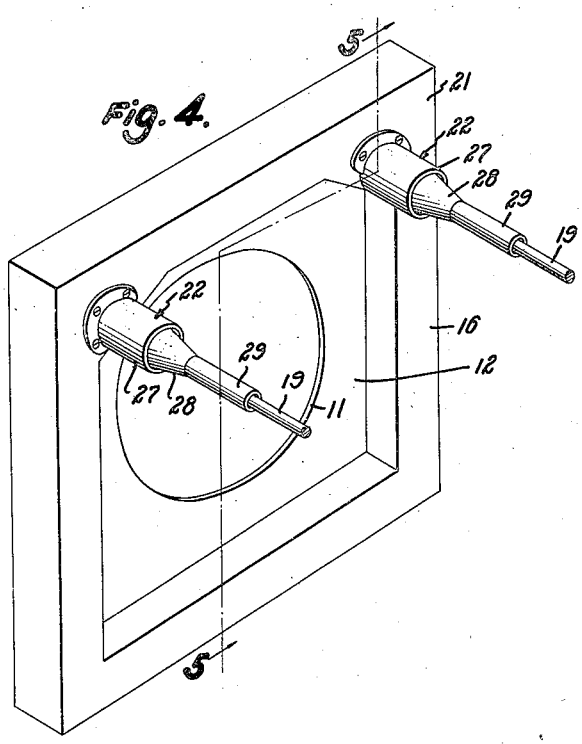
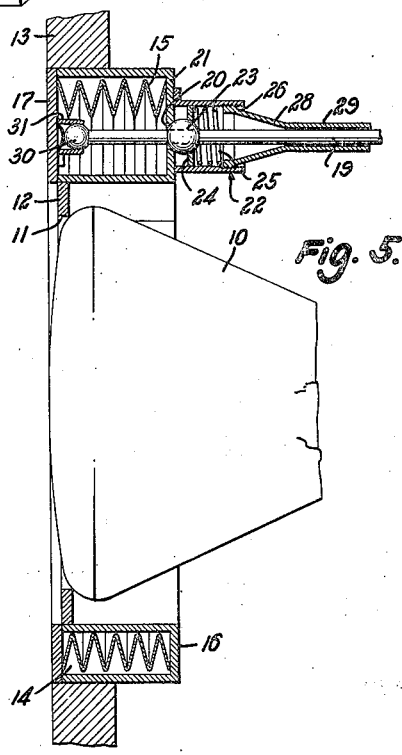

Feb. 7, 1950 J. K. ROSE 2,496,752
LIGHT SHIELD FOR OSCILLOSCOPES, TELEVISION
RECEIVERS, AND THE LIKE
Filed Sept. 12, 1946 5 Sheets-Sheet 3

INVENTOR:
Joseph K. Rose,
BY
Pierce, Scheffler & Parker,
ATTORNEYS.

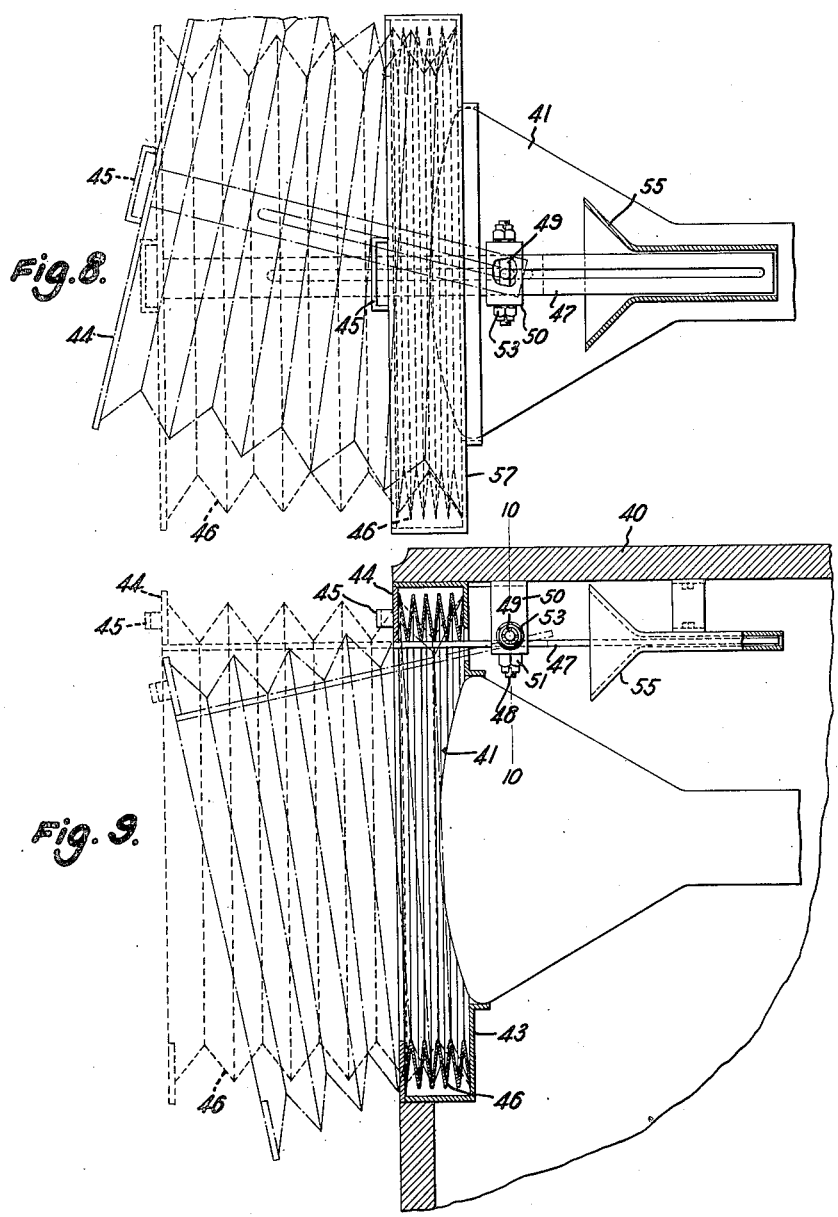

Feb. 7, 1950 J. K. ROSE 2,496,752
LIGHT SHIELD FOR OSCILLOSCOPES, TELEVISION
RECEIVERS, AND THE LIKE
Filed Sept. 12, 1946 5 Sheets-Sheet 5
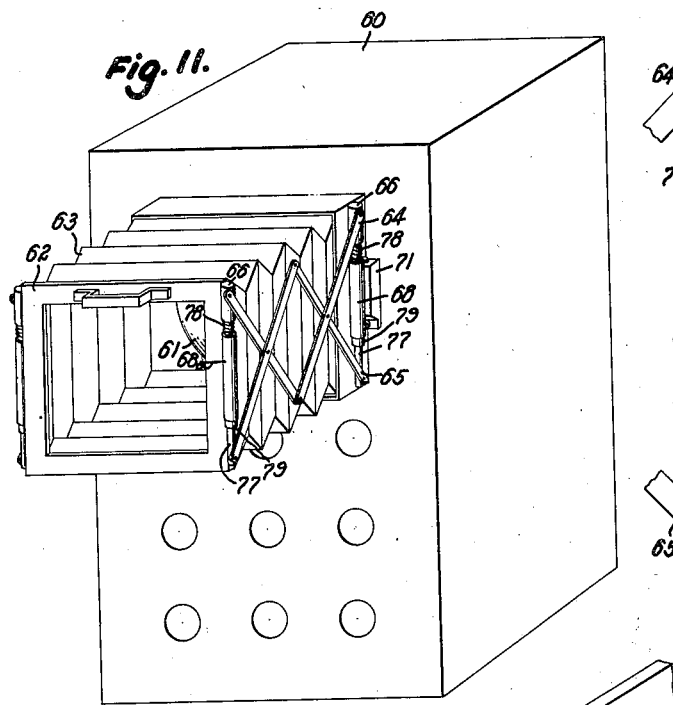
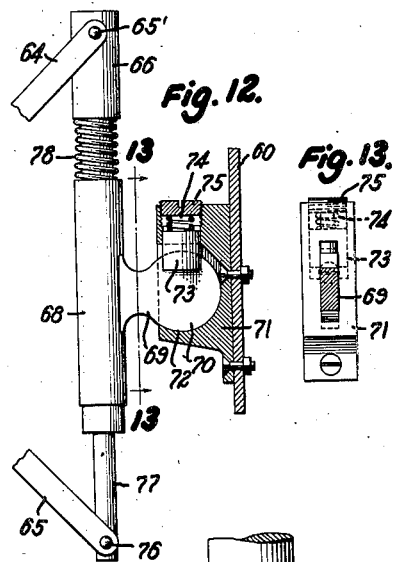
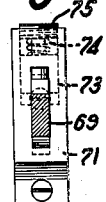
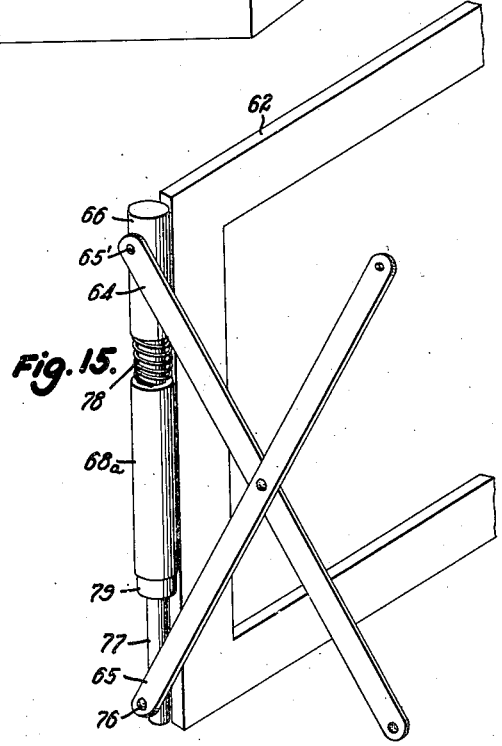
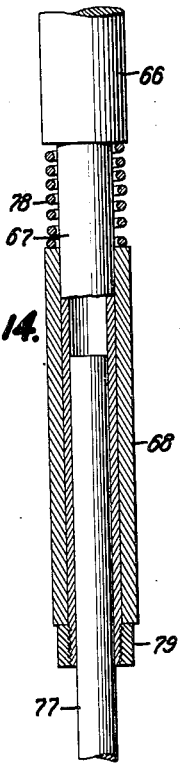
INVENTOR:
Joseph K. Rose,
BY
Pierce, Scheffler & Parker
ATTORNEYS.

Patented Feb. 7, 1950

2,496,752

UNITED STATES PATENT OFFICE 2,496,752

LIGHT SHIELD FOR OSCILLOSCOPES, TELEVISION RECEIVERS, AND THE LIKE

Joseph K. Rose, Chicago, Ill.

Application September 12, 1946, Serial No. 696,592

7 Claims. (Cl. 178—7.5)

This invention relates generally to light shields and it has particular relation to light shields for television receivers, oscilloscopes, and the like.

The principal object of the invention is to provide a light shield that is easily and quickly extensible and retractable so that no light shield, a short shield or a long light shield may be readily obtained as required depending on light intensity of image and external light conditions. Another object of the invention is to provide for mounting a light shield so that it may be extended to any of a wide range of positions to permit viewing the image exhibiting screen from a correspondingly wide range of viewpoints. An object is to provide for substantially universally mounting the extensible light shield so that it can be adjusted in any of three planes at right angles to each other. Still another object is to provide for insuring the restoration of the extensible light shield to retracted position regardless of the position from which or the path along which the restoration is initiated.

Other objects and advantages of this invention will in part be obvious and in part appear hereinafter.

For more complete understanding of the nature and scope of this invention reference can be had to the following specification taken together with the accompanying drawings, in which:

Fig. 3 is a view similar to Fig. 2, but with the bellows omitted to more clearly illustrate the manner in which the frame is mounted;

Fig. 4 is a fragmentary perspective view looking from the rear of the upper portion of the front wall of the cabinet on which the extensible light shield is mounted;

Fig. 5 is a detail sectional view taken along the line 5—5 of Fig. 4;

Fig. 8 is a top plan view of another form of light shield embodying the invention;

Fig. 9 is a view, partly in side elevation and partly in section, of the light shield shown in Fig. 8;

Fig. 10 is a detail sectional view taken along the line 10—10 of Fig. 9;

Fig. 11 is a perspective view of still another embodiment of the invention illustrated in connection with an oscilloscope, television receiver or the like;

Fig. 12 is a partial sectional view on an enlarged scale of the rear mounting means for the lazy tongs shown in Fig. 11;

Fig. 13 is a section on the line 13—13 of Fig. 12, is a fragmentary perspective view of the connections of the lazy tongs to the frame; and Fig. 14 is a fragmentary vertical section on an enlarged scale through the connection; and Fig. 15 is a fragmentary perspective view of the front end of the shield mounting of Fig. 11.

Figure 1:
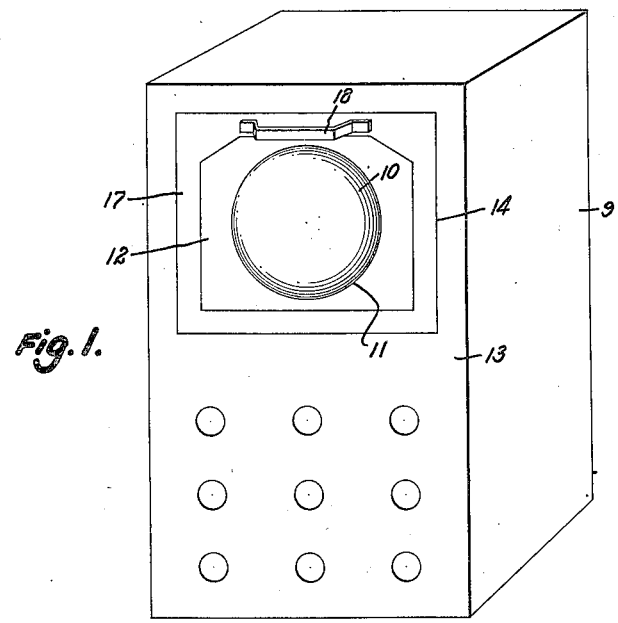
Fig. 1 is a perspective view of an oscilloscope or the like in which the light shield of the present invention is incorporated.

Referring now particularly to the embodiment of the invention illustrated in Figs. 1-6, reference numeral 9 designates a cabinet housing an oscilloscope, television receiver, or the like, which includes a cathode ray tube or other image-displaying screen 10 mounted within the cabinet and framed in an opening 11 in a panel 12 forming part of the front wall 13 of the cabinet. The front wall of the cabinet is provided with a recess or channel 14 outlining the panel 12. The recess 14 which provides a housing for an extensible bellows or equivalent light shield 15, is provided by a recessed rectangular frame 16 or channel which may be formed as a part of or be mounted in the front wall 13 of the cabinet. The inner end of the bellows 15 is secured in the bottom of the channel 14 and the outer end thereof is secured to a frame 17 dimensioned to seat in the channel 14 and preferably to lie flush with the panel 12 and the adjacent part of the front wall 13 of the cabinet when the bellows is collapsed into the recess 14. A handle 18 is provided for manipulating the frame in extending, collapsing and adjusting the light shield.

Figure 2:
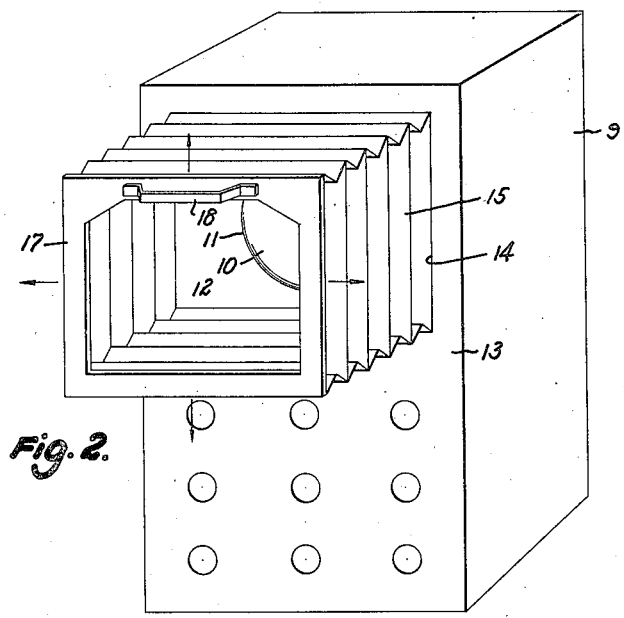
Fig. 2 is a perspective view similar to Fig. 1 but showing the light shield in one extended position.

In order to provide for the most advantageous and convenient use of the light shield and to permit observation of the screen from positions other than directly in front thereof, the frame 17 is mounted so that it and the extended portion of the light shield secured thereto are movable in all directions from a neutral extended position, as indicated by the arrows in Fig. 2. The frame 17 is supported by a pair of rods 19 which extend through apertures 20 in the bottom wall 21 of the recess 14 and are slidably supported in universal mountings 22. Each of the universal mountings comprises a ball member 23 in which the associated rod 19 is slidably mounted. Each ball member 23 is confined between an apertured pressure plate 24 and the apertured rear wall 21 of the channel 14. Adjustable tension on the pressure plate 24 is provided by a spring 25 confined between the plate 24 and an adjustable collar 26 threaded in the end of a tubular sleeve 27 mounted on the rear wall 21. The collar 26 carries a rearwardly extending conical or funnel shaped guide 28 which terminates in a rearwardly extending tubular portion 29 into which the rod 19 extends when the light shield is collapsed.

Figure 6:
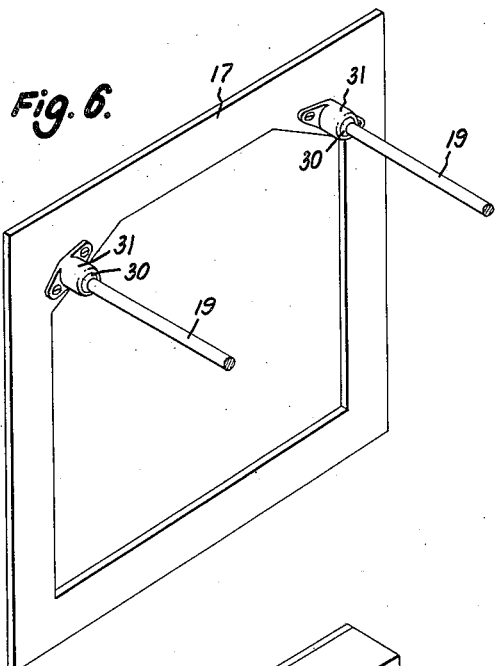
Fig. 6 is a fragmentary perspective view from the rear of the forward frame of the light shield and showing the universal mounting of the front frame.

The forward end of each of the rods 19 is connected by a universal connection to the rear face of the frame 17. This connection, as seen in Figs. 5 and 6, is made by providing ball ends 30 on the outer ends of the rods 19 which are held in friction sockets 31 secured to the frame 17.

The length of the rods 19 with relation to the extent of outward movement permitted the frame 17 upon extension of the bellows is such that the inner ends of the rods will clear the tubular portion 29 of the funnel shaped guides and extend only a short distance rearwardly of the ball mounts 23. Accordingly it will be observed that a universal motion may be imparted to the outer ends of the rods and to the frame 17 carried thereby in order to place the extended bellows in the most advantageous position to permit a clear view of the screen from a wide range of viewpoints. Upon movement of the frame 17 inwardly to collapse the bellows from any position which it may occupy, the inner ends of the rods 19 will engage the conical portions of the funnel shaped guides to automatically bring the frame and bellows to a centered position and guide the ends of the rods into the tubular portions of the guides.

Figure 7:
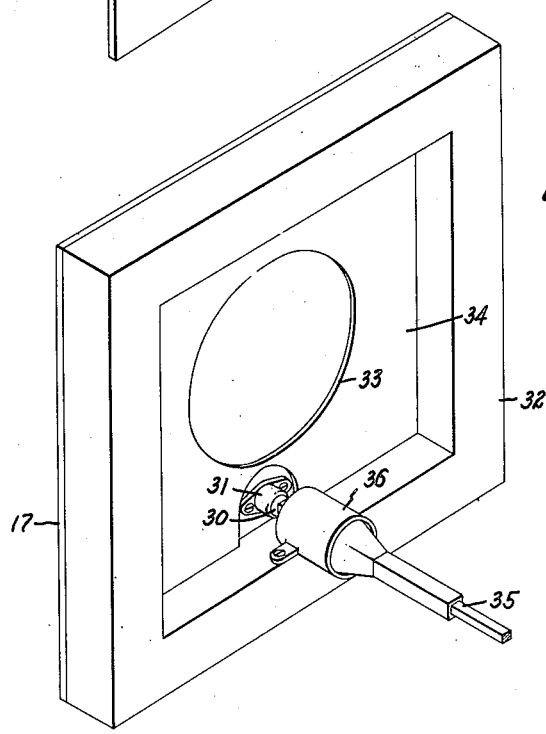
Fig. 7 is a fragmentary perspective view showing a modified form of the mounting means for the forward frame of an extensible light shield.

Referring now more particularly to the modified form of the invention shown in Fig. 7, 32 is a recessed frame similar to the frame 16, which frame provides the recess for receiving the bellows, not shown and is secured in position on or formed as a part of the front wall of the cabinet housing the apparatus for displaying an image on a screen occupying the opening 33 in the image framing panel 34. In this embodiment of the invention a single rectangular rod 35 is provided for supporting the forward frame of the extensible light shield, which is similar to the frame 17. The rectangular rod 35 is mounted in a suitable universal mounting 36 supported on the lower rail or channel of the frame 32, and has the forward end thereof secured to the rear face of the frame of the extensible light shield by a connection similar to that used for the rods 19. The universal mounting 36 is similar to the mounting 22 except that the funnel shaped guide and rearward tubular portion thereof as well as the bore through the ball mount are also rectangular to accommodate the rod and prevent axial rotation thereof.

Referring to the form of the invention shown in Figs. 8, 9, and 10 of the drawings, the reference numeral 40 designates the top wall of a cabinet for a television receiver, oscilloscope, or the like which is provided with image exhibiting means or screen 41 that is suitably mounted in a frame 43 set in the front wall of the cabinet. A light shield frame 44 is provided with a handle 45 by which the frame 44 and collapsible bellows 46 may be extended in front of the cabinet and shifted into various positions as shown by the broken lines in Figs. 8 and 9. The frame 44 is carried by a relatively rigid flat bar 47 that is slotted to receive the threaded stud 48 of a supporting bolt 49 that is suspended below the top wall 40 by a bracket 50. The bar 47 is slidable and angularly adjustable on the stud 48, and a clamp nut 51 and spring washer 52 on the stud provide sufficient frictional resistance to retain the bar 47 in any selected position. Similar nuts 53 and spring washers 54 on the bolt 49 prevent inadvertent movement of the bolt in the bracket 50 but permit rocking of the bolt when the shield frame 44 is to be moved up or down. A funnel shaped guide 55 is mounted at the rear of the bracket 50 to facilitate the retraction of the bar 47 when the latter has been adjusted angularly to tilt the light shield supported by the forward end thereof.

The cabinet 60 of the television receiver, oscilloscope or the like of Figs. 11 to 14, has an image exhibiting screen 61 located at or somewhat back of the front wall and within a panel framed by the front frame 62 of the extensible bellows 63. This extensible light shield is supported on the cabinet by a pair of lazy tongs that each have a rearward set of crossed members 64 and 65. The free end of the member 64 is connected by a pivot pin 65' to an enlarged head 66 carried on the upper end of a sleeve 67 that may slide and turn within a bracket sleeve 68 mounted for tilting motion on the cabinet 60 through the medium of a shank formed with the sleeve and having an integral substantially circular disk head 70 frictionally held in a socket member 71 fastened to the cabinet. The socket 71 provides a seat 72 into which the disk head 70 snugly fits and in which it is held by a spring pressed slotted plug 73 which bears on the edge of the disk opposite the seat 72. The tension of spring 74 on the plug 73 may be adjusted by a set screw 75. The free end of the rear lazy tong member 65 is connected by pivot pin 76 to the lower end of a rod 77 which telescopes within the sleeve 67. A coil spring 78 confined between the upper end of the bracket sleeve 68 and the head 66 on the sleeve 67 provides resiliency for the mounting and upward movement of the sleeve 67 is limited by a threaded collar 79 on the lower end thereof.

The forward crossed members of the lazy tongs are pivoted to a mounting of substantially the same construction as the rear mounting except that the bracket sleeve 68a of the forward mounting is rigidly secured to the side of the frame 62 in each instance.

The lazy tong mount for the light shield provides an efficient support therefor in any extended position and permits the swinging of the outer end of the extended shield from side to side. The frictional mounting of the bracket sleeves 68 also permit vertical tilting movement so that the shield is capable of universal adjustment.

Although preferred embodiments of the invention have been shown and described by way of illustration, it will be understood that various other modifications and changes in the details of construction may be resorted to without departing from the spirit of the invention as defined by the appended claims.

I claim:

1. In a television receiver, oscilloscope or the like, including image exhibiting means and a cabinet for said image exhibiting means, a frame through which said image exhibiting means can be viewed, elongated rigid means movable into and out of said cabinet for supporting said frame in variable spaced relation with respect to said image exhibiting means, universal joint means operatively interconnecting said elongated rigid means and said cabinet universal joint connecting means between the outer extremity of said elongated rigid means and said frame whereby said frame is movable in three planes at right angles to each other to permit viewing of said image exhibiting means from any of a wide range of positions relative to said cabinet, and collapsible means interconnecting said frame and said cabinet and forming a light shield around the space between said frame and said image exhibiting means in whatever position the former may be placed.

2. The invention as set forth in claim 1 wherein said universal joint means includes a ball and socket member and said elongated rigid means is movable through the ball member of said universal joint means.

3. In a television receiver, oscilloscope or the like, including image exhibiting means and a cabinet for said image exhibiting means, a frame through which said image exhibiting means can be viewed, elongated rigid means movable into and out of said cabinet for supporting said frame in variable spaced relation with respect to said image exhibiting means, universal joint means operatively interconnecting said elongated rigid means and said cabinet, universal joint connections between the extremities of said rigid means and said frame, whereby said frame is movable in three planes at right angles to each other to permit viewing of said image exhibiting means from any of a wide range of positions relative to said cabinet, guide members carried by said cabinet engageable by said frame supporting means for guiding said frame supporting means relative to said cabinet whereby said frame is returned to predetermined position when it is restored to non-operative position, and collapsible means interconnecting said frame and said cabinet and forming a light shield around the space between said frame and said image exhibiting means in whatever position the former may be placed.

4. The invention as set forth in claim 3 wherein said universal joint means includes a ball and socket member and said elongated rigid means is movable through the ball member of said universal joint means.

5. In a television receiver, oscilloscope or the like, including image exhibiting means and a cabinet for said image exhibiting means, a frame through which said image exhibiting means can be viewed, means comprising a pair of rods extensible with respect to and carried by said cabinet for supporting said frame in variable spaced relation with respect to said image exhibiting means, means mounting said rods for substantially universal movement relative to said cabinet, universal joint connections between the extremities of said rods and said frame, and collapsible means interconnecting said frame and said cabinet and forming a light shield around the space between said frame and said image exhibiting means in whatever position the former may be placed.

6. In a television receiver, oscilloscope or the like, including image exhibiting means and a cabinet for said image exhibiting means, a frame through which said image exhibiting means can be viewed, means comprising a single rod of non-circular cross section movable with respect to and carried by said cabinet for supporting said frame in variable spaced relation with respect to said image exhibiting means, means including a member having a bore of the same cross section as said rod and through which the rod extends mounting said rod for substantially universal movement relative to said cabinet, and collapsible means interconnecting said frame and said cabinet and forming a light shield around the space between said frame and said image exhibiting means in whatever position the former may be placed.

7. In a television receiver, oscilloscope or the like, including image exhibiting means and a cabinet for said image exhibiting means, a frame through which said image exhibiting means can be viewed, a single rod of non-circular cross section secured at its outer end to the under side and centrally of said frame and movable into and out of said cabinet for supporting the former in variable spaced relation with respect to said image exhibiting means including a member having a bore of the same cross section as said rod and through which the rod extends, means mounting said rod on said cabinet for substantially universal movement relative thereto, and collapsible means interconnecting said frame and said cabinet and forming a light shield around the space between said frame and said image exhibiting means in whatever position the former may be placed.

JOSEPH K. ROSE.

REFERENCES CITED

The following references are of record in the file of this patent:

UNITED STATES PATENTS

| Number | Name | Date |
| --- | --- | --- |
| 1,012,383 | Lyhne | Dec. 19, 1911 |
| 1,101,532 | Folmer | June 30, 1914 |
| 1,143,045 | Freud | June 15, 1915 |
| 1,578,842 | Mitchell | Mar. 30, 1926 |
| 2,368,882 | Rose | Feb. 6, 1945 |
| 2,376,993 | Evans | May 29, 1945 |

FOREIGN PATENTS

| Number | Country | Date |
| --- | --- | --- |
| 527,065 | Germany | May 28, 1931 |

Certificate of Correction

Patent No. 2,496,752        February 7, 1950

JOSEPH K. ROSE

It is hereby certified that errors appear in the printed specification of the above numbered patent requiring correction as follows:

Column 6, line 36, strike out the comma and word ", means" and insert the same before "including" in line 34, same column;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*